Feb. 18, 1936.                    P. BISCHOF                    2,031,247
                                 TRANSMISSION
                              Filed June 28, 1935                2 Sheets-Sheet 1
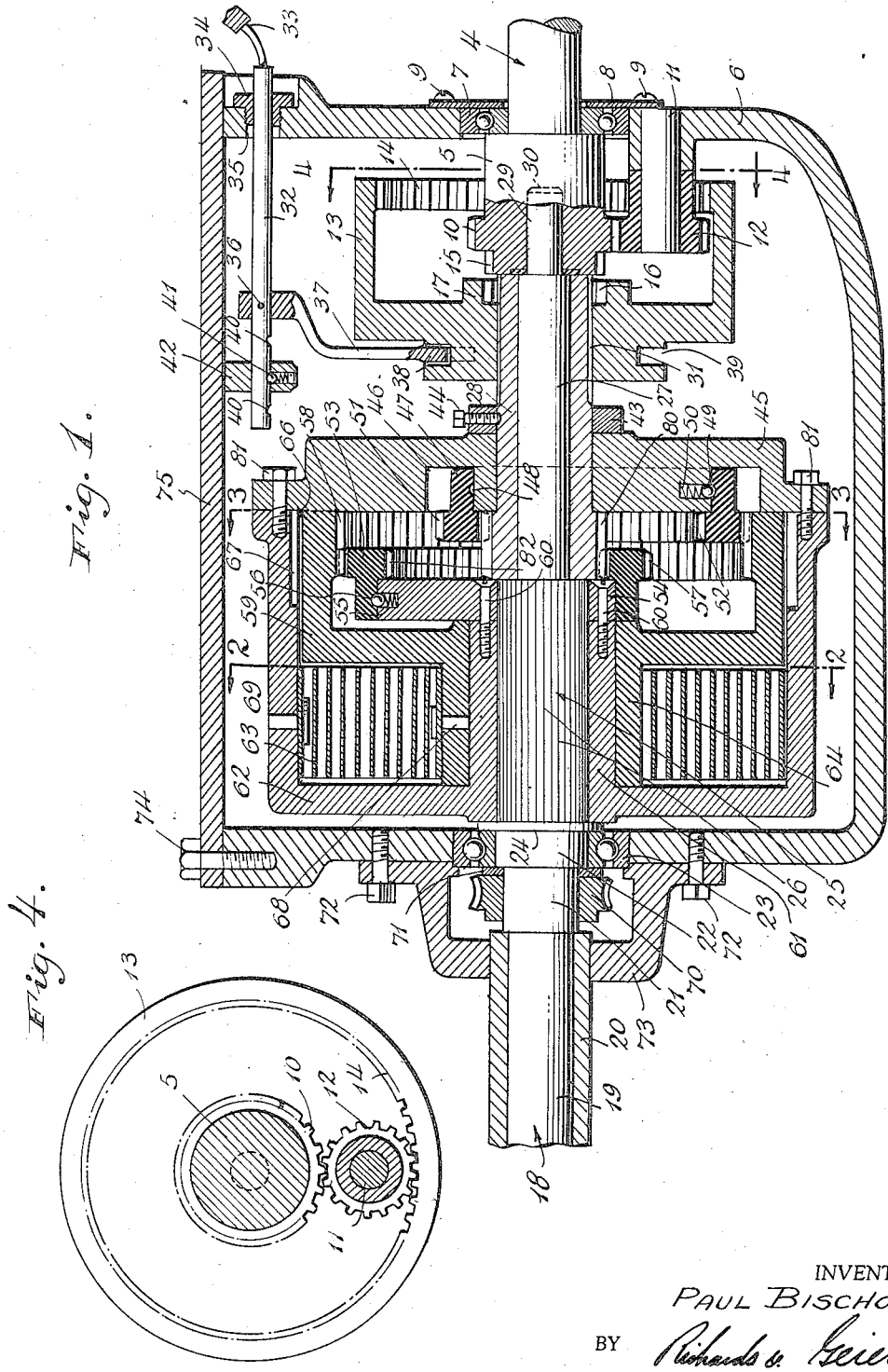
INVENTOR.
PAUL BISCHOF
BY
ATTORNEYS Feb. 18, 1936.  P. BISCHOF  2,031,247
TRANSMISSION
Filed June 28, 1935  2 Sheets-Sheet 2
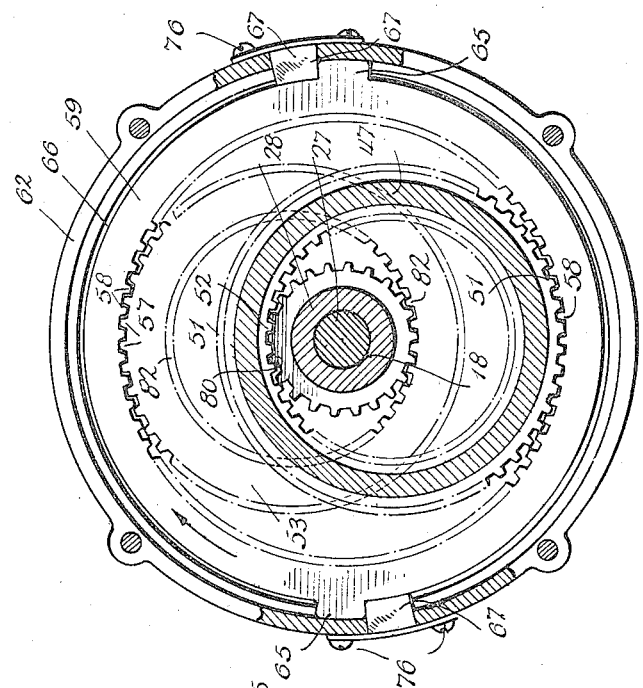
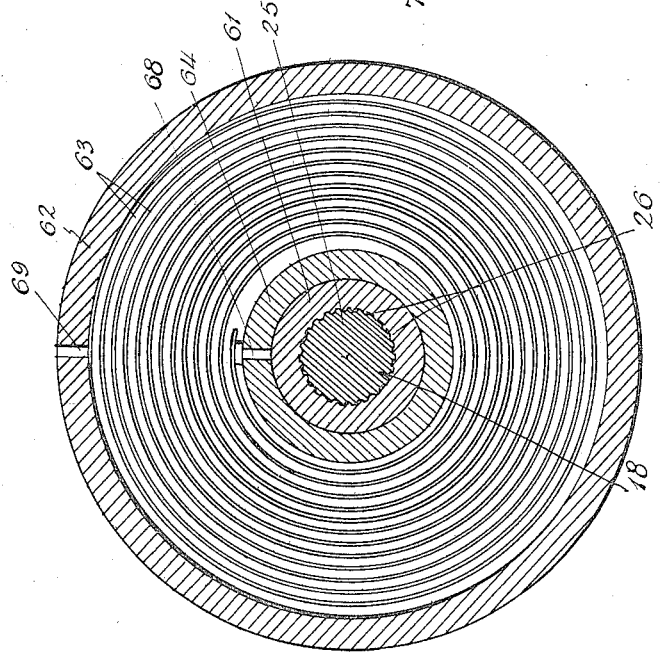
INVENTOR.
PAUL BISCHOF
BY
ATTORNEYS Patented Feb. 18, 1936

2,031,247

UNITED STATES PATENT OFFICE 2,031,247

TRANSMISSION

Paul Bischof, Bronx, N. Y.

Application June 28, 1935, Serial No. 28,903

6 Claims. (Cl. 74—414)

This invention relates to a transmission, and refers more particularly to a shiftless transmission for various types of engines, such as automobile engines, by means of which the rotation of a driving shaft is transmitted to a driven shaft.

An object of the present invention is the provision of a transmission by means of which the rotation of the driving shaft may be gradually transmitted to the driven shaft without any jerks, or without subjecting any of the parts of the transmission to excessive forces.

Another object is to eliminate the shifting from one gear to the other which has been necessary heretofore in automobile engines and the like, and to provide in lieu thereof, a shiftless transmission by means of which the rotation of the driving shaft is gradually transmitted to the driven shaft.

The above and other objects of the present invention may be realized through the provision of a transmission comprising a driven shaft which is surrounded by a spiral leaf spring. Elements rotated by the driving shaft are connected with one end of the spring, while its other end is connected with elements rotating along with the driven shaft. A suitable coupling operatively connects the driving shaft with the driven shaft after the spring has been wound or unwound to a certain predetermined extent by the driving shaft.

The invention will appear more clearly from the following detailed description when taken in connection with the accompanying drawings showing by way of example a preferred embodiment of the inventive idea.

In the drawings:

Figure 1 is a longitudinal section through the device constructed in accordance with the principles of the present invention.

Figure 2 is a section along the line 2—2 of Figure 1.

Figure 3 is a section along the line 3—3 of Figure 1.

Figure 4 is a section along the line 4—4 of Figure 1.

The device illustrated in the drawings comprises a driving shaft 4 comprising an end portion or stub 5, which is situated within the casing 6. The shaft 4 is supported by a ball bearing 7 which is carried by the casing 6. A thin plate 8 is attached by bolts 9 to the casing 6 and is used for holding in place the ball bearing 7 and for covering the opening formed in the casing 6 through which the driving shaft 4 is inserted into the casing 6.

The end portion 5 of the shaft 4 is provided with teeth 10 which are integral with the shaft.

The casing 6 supports a pin 11 carrying a pinion 12, the teeth of which mesh with the teeth 10 of the shaft stub 5.

The shaft stub 5 is partly surrounded by a hollow cylindrical clutch member 13 which is provided with inner teeth 14, arranged in the form of a crown surrounding the shaft stud 5. The end portion of the shaft stub 5 is provided with teeth 15 which may be brought into engagement with the inner teeth 16 of an annular flange 17 forming an integral part of the cylindrical member 13.

As shown in Figure 1, the driven shaft 18 of the transmission comprises a portion 19 which is carried by a sleeve 20 and another portion 21 having a larger diameter. The portion 22 of the driven shaft 18 is supported by a ball bearing 23 which is carried by the casing 6. A thin annular plate 24 which constitutes an integral part of the driven shaft 18 separates the portion 22 of the shaft from the portion 25 which is provided with a number of parallel grooves 26 extending in the direction of the longitudinal axis of the shaft 18. A narrower portion 27 of the shaft 18 is carried by sleeve 28. The end portion 29 of the driven shaft 18 projects into a central bore-hole 30 formed in the portion 5 of the driving shaft 4.

The sleeve 28 is provided with a number of grooves 31 which engage corresponding projections formed in the cylindrical member 13. Due to this arrangement, the cylindrical member 13 may slide upon the sleeve 28 in the direction of its longitudinal axis, although it is rotatable along with the sleeve 28.

In the position shown in Figure 1 of the drawings, the cylindrical member 13 does not engage the shaft stub 5, so that the rotation of the driving shaft 4 is not transmitted to the cylindrical member 13. If the cylindrical member 13 is moved further towards the right (looking in the direction of Figure 1), the teeth 16 of the member 13 will be brought into engagement with the teeth 15 of the shaft stub 5. Then the member 13 will rotate along with the driving shaft 4 and in the same direction.

If the cylindrical member 13 is moved to the left from the position shown in Figure 1 (looking in the direction of that figure), the teeth 14 of the member 13 will be finally brought in engagement with the teeth of the pinion 12. Since the pinion 12 meshes with the teeth 10, the cylindrical member 13 will be rotated in a direction opposite to that of the rotation of the driving shaft 4.

The sliding movements of the member 13 are caused by lever 32 which is operated by a member 33 and which passes through an opening formed in a bolt 34, screwed into a threaded opening 35 which is formed in the casing 6. A pin 36 connects the lever 32 with one end of a lever 37, the opposite end of which comprises a portion 38 situated in a groove 39 formed in the cylindrical member 13.

The lever 32 is provided with several notches 40 and is held in place by a resilient member 41 situated within a support 42 and pressing against the notches 40. The support 42 is rigidly connected with a wall of the cover 75.

A ring 43 is firmly connected with the sleeve 28 by a bolt 44 and is used as an abutment which is in contact with a large disc 45.

That end of the sleeve 28, which is furthest away from the driving shaft 4, is provided with teeth 80, which form an integral part of the sleeve.

The large disc 45, is provided with an annular cavity 46 which serves as a support for an annular toothed crown 47. The crown 47 is provided with an inner groove 48. Balls 49 situated within suitable grooves formed in the disc 45, are pressed by springs 50 against the walls of the groove 48 formed in the crown 47.

While the large disc 45 is concentrical in relation to the shaft 18, so that its central axis coincides with the central axis of the driven shaft, the annular cavity 46, and the crown 47, are eccentrical in relation to the driven shaft 18, the central axes of the cavity 46 and of the crown 47 being located below the central axis of the shaft 18 (looking in the direction of Figure 1).

The crown 47 is provided with outer teeth 51 and with inner teeth 52. The inner teeth 52 are in engagement with the teeth 80 of the sleeve 28.

The teeth 80 of the sleeve 28 are also in engagement with the inner teeth 82 of a toothed crown 53. The crown 53 is carried by a disc 54 which is slidably mounted upon the grooved shaft portion 25. Springs 55 situated within suitable grooves formed in the disc 54 press the balls 56 against the walls of a groove formed in the crown.

The crown 53 is also provided with outer teeth 57 which mesh with the inner teeth 58 of a large cylindrical member or coupling 59.

Bolts 60 pass through suitable openings provided in the disc 54 and are screwed into a sleeve 61 which is slidably mounted upon the grooved shaft portion 25. Due to this arrangement, the sleeve 61 and the disc 54 are both movable as a single piece along the shaft 25 in the direction of its longitudinal axis, although at the same time, both the sleeve 61 and the disc 54 are rotatable along with the driven shaft.

The sleeve 61 is rigidly connected with and forms an integral part of the inner casing 62 which contains the spiral flat spring 63, and which is firmly connected by bolts 81, with the large disc 45.

The cylindrical coupling 59 is provided with a sleeve portion 64 which is mounted upon the sleeve portion 61 of the inner casing 62.

As shown more clearly in Figure 3 of the drawings, the cylindrical coupling 59 is provided with suitable projections 65, which are situated within a space 66, provided between the outer wall of the coupling 59 and an inner wall of the inner casing 62. Projections or abutments 67, shown in Figure 3, are carried by the walls of the casing 62 and are held in place by the bolts 76.

When the cylindrical member 59 is rotated, the projections 65, forming an integral part of the coupling 59, are rotated along with the coupling until they are brought in contact with the projections 67 firmly connected with the casing 62.

From that time on, the two members 59 and 62 continue to rotate along with each other.

The inner end of the spiral spring 63 is firmly connected by a bolt 68 with the sleeve 64 forming an integral part of the coupling 59. The opposite outer end of the spiral spring 63 is connected by a bolt 69 with a casing 62. Due to this arrangement, the spring 63 is wound and tightened to a certain extent while there is relative motion between the coupling 59 and the inner casing 62.

The portion 21 of the driven shaft 18 carries a worm gear 70 which is separated by washer 71 from the ball bearing 23. The worm gear 70 transmits the rotation of the driven shaft 18 to any suitable device not shown in the drawings. Bolts 72 are used for attaching the cover 73 which surrounds the worm gear 70 to the casing 6. Other bolts 74 connect the cover 75 with the casing 6.

The device is operated as follows:

In the position shown in Figure 1, the driving shaft 4 which rotates along with the pinion 12, does not transmit its rotation to the driven shaft 18. In order to connect the driven shaft with the driving shaft, it is necessary to move the lever 32 which is actuated by the member 33. If the lever 32 is moved to the right (looking in the direction of Figure 1) it will pull along with it the slidable member 13, until the teeth 16 of the member 13 are brought into engagement with the teeth 15 formed upon the driving shaft 4. Then the member 13 will rotate along with the driving shaft 4. Since the member 13 is rotatably mounted upon the sleeve 28, this sleeve will rotate along with the member 13.

The teeth 80 of the sleeve 28 engage the teeth 82 of the crown 53 and the teeth 52 of the crown 47. Due to this arrangement, the rotation of the sleeve 28 will be transmitted to the two crowns 53 and 47.

The teeth 57 of the crown 53 engage the teeth 58 of the coupling 59, while the outer teeth 51 of the crown 47 also engage the same teeth 58. Due to this arrangement which results in an excellent equilibrium of forces, the coupling 59 is rotated along with the sleeve 28.

Since the inner end of the spiral spring 63 is connected with the sleeve 64 which forms an integral part of the coupling 59, the coupling 59 will gradually begin to wind the spring 63, or unwind it, depending upon the direction of the rotation.

As shown more clearly in Figure 3, the coupling 59 is permitted to rotate independently only for a predetermined fraction of one revolution, namely until the projections 65 of the coupling 59 are brought in contact with the projections 67 which are firmly connected with the inner casing 62.

As soon as the projections 65 come in contact with the projections 67, the inner casing 62 begins to rotate along with the coupling 59. Since the casing 62 is rotatably mounted upon the portion 25 of the driven shaft 18, the shaft 18 will rotate along with the casing 62.

The rotation of the shaft 18 may be transmitted to any suitable device by means of the worm gear 70.

In order to reverse the direction of rotation of the driven shaft 18, it is merely necessary to push the lever 32 to the left (looking in the direction of Figure 1). Since the sliding member 13 is connected with the lever 32 by means of the lever 37, the member 13 will be moved along with the lever 32, so that the teeth 16 will be moved out of contact with the teeth 15. Then the operative connection between the driving shaft 4 and the driven shaft 18 will be interrupted. If the member 13 is moved further in the same direction, the teeth 14 will finally come in contact with the teeth of the pinion 12. Then the member 13 and the driven shaft 18 will be rotated in a direction opposite to the direction of rotation of the driving shaft 4.

What is claimed is:

1. In a transmission having a driving shaft and a driven shaft; a casing having a cylindrical sleeve which is slidably mounted upon said driven shaft and is rotatable therewith, a cylindrical outer wall which is concentrical with said sleeve, and a bottom portion interconnecting said sleeve and said outer wall; a spiral spring situated within said casing between said sleeve and said outer wall and having an outer end which is connected with the outer wall of said casing, a coupling adapted to be coupled with said casing and to be moved independently thereof, the inner end of said spiral spring being connected with said coupling, and means transmitting the rotation of the driving shaft to said coupling.

2. In a transmission having a driving shaft and a driven shaft; a spiral spring, a casing rotatable along with the driven shaft and connected with the outer end of said spring, a sleeve constituting a part of said casing, a coupling having a sleeve portion surrounding said sleeve an outer cylindrical wall and an intermediate wall interconnecting said sleeve portion and said outer cylindrical wall; the inner end of said spiral spring being connected with the sleeve portion of said coupling, and means transmitting the rotation of the driving shaft to the outer cylindrical wall of the coupling.

3. In a transmission having a driving shaft and a driven shaft; a casing having a cylindrical sleeve which is slidably mounted upon said driven shaft and is rotatable therewith, a cylindrical outer wall which is concentric with said sleeve, and a bottom portion interconnecting said sleeve and said outer wall; a coupling having a sleeve portion surrounding the sleeve of said casing and in frictional contact therewith, an outer cylindrical wall and an intermediate wall interconnecting said sleeve portion and said outer cylindrical wall; a spiral spring having turns extending around said driven shaft between the outer wall of said casing and the sleeve portion of said coupling, the outer end of said spiral spring being connected with the outer wall of said casing, the inner end of said spring being connected with the sleeve portion of said coupling, projections carried by the outer wall of said casing, other projections carried by the outer wall of said coupling and adapted to come in contact with the first-mentioned projections, and means transmitting the rotation of the driving shaft to the outer cylindrical wall of the coupling.

4. In a transmission having a driving shaft and a driven shaft, a spiral spring surrounding the driven shaft, a casing rotatable along with the driven shaft and connected with the outer end of said spiral spring, projections carried by said casing, a coupling having projections adapted to come in contact with the first-mentioned projections, the inner end of said spiral spring being connected with said coupling, a toothed crown having two sets of teeth, said coupling having teeth meshing with one of said sets, a sleeve having teeth meshing with the other one of said sets, and a slidable member rotatable along with said sleeve and adapted to be driven by the driving shaft.

5. In a transmission having a driving shaft and a driven shaft, a spiral spring surrounding a portion of the driven shaft, a casing mounted upon the driven shaft and rotatable therewith, the outer end of said spiral spring being connected with said casing, projections carried by said casing, a coupling having projections adapted to come in contact with the first-mentioned projections, the inner end of said spiral spring being connected with said coupling, an eccentric disc firmly connected with said casing, an eccentric crown carried by said disc, said crown having two sets of teeth, said coupling having teeth meshing with one of said sets, a sleeve mounted upon the driven shaft and having teeth meshing with the other one of said sets, a disc mounted upon said sleeve and firmly connected with said casing, another eccentric crown having two sets of teeth and carried by the last-mentioned disc, the teeth of one of the last-mentioned sets meshing with the teeth of said sleeve, the teeth of the other one of the last-mentioned sets meshing with the teeth of said coupling, and a slidable member rotatable along with said sleeve and adapted to be driven by the driving shaft.

6. In a transmission, a driving shaft, a driven shaft, a spiral spring surrounding a portion of the driven shaft, an inner casing mounted upon the driven shaft and rotatable therewith, the outer end of said spiral spring being connected with said casing, projections carried by said casing, a coupling having projections adapted to come in contact with the first-mentioned projections, the inner end of said spiral spring being connected with said coupling, an eccentric disc firmly connected with said casing, an eccentric crown carried by said disc, said crown having two sets of teeth, said coupling having teeth meshing with one of said sets, a sleeve mounted upon the driven shaft and having teeth meshing with the other one of said sets, a disc mounted upon said sleeve and firmly connected with said casing, another eccentric crown having two sets of teeth and carried by the last-mentioned disc, the teeth of one of the last-mentioned sets meshing with the teeth of said coupling, a member slidably mounted upon said sleeve and rotatable therewith, said member having two sets of teeth, a pinion, said driving shaft having teeth meshing with said pinion and other teeth adapted to mesh with the teeth of one of the last-mentioned sets, the teeth of the other one of the last-mentioned sets being adapted to mesh with said pinion, and means connected with said member for moving the same along said sleeve.

PAUL BISCHOF.